United States Patent [19]
Maeda et al.

[11] Patent Number: 5,062,012
[45] Date of Patent: Oct. 29, 1991

[54] LINEAR ACCESS MECHANISM WITH DRIVING FORCE REACTION CANCELLING DEVICE AND MAGNETIC DISK APPARATUS USING THE SAME

[75] Inventors: Naoki Maeda; Yozo Nakamura; Yuzo Kadomukai; Shunichi Mitsuya, all of Ibaraki; Tsuyoshi Takahashi; Jun Naruse, both of Odawara, all of Japan

[73] Assignee: Hitach, Ltd., Tokyo, Japan

[21] Appl. No.: 324,556

[22] Filed: Mar. 16, 1989

[30] Foreign Application Priority Data

Mar. 18, 1988 [JP] Japan .................................. 63-63376
Jul. 6, 1988 [JP] Japan ................................. 63-166745

[51] Int. Cl.⁵ ...................... G11R 21/02; H02K 33/18
[52] U.S. Cl. .................................. 360/75; 360/78.12; 318/135; 369/215; 369/247; 369/251
[58] Field of Search ............... 369/215, 219, 244, 247, 369/251, 44.14, 253; 318/135; 310/15, 17, 13; 360/75, 78.04, 77.03, 78.05, 78.06, 78.11, 78.12, 106, 105, 78.07–78.09, 104

[56] References Cited

U.S. PATENT DOCUMENTS 4,349,851 9/1982 Higashiyama et al. ............. 360/105
4,516,231 5/1985 Michaelis ......................... 369/44.14
4,583,135 4/1986 Kimura ............................ 360/77.16
4,616,277 10/1986 Berti ..................................... 360/75

FOREIGN PATENT DOCUMENTS 49-9680    3/1974 Japan .
49-49799   8/1974 Japan .
58-132470  8/1983 Japan .
59-65640   4/1984 Japan .................................... 310/17
63-206148  8/1988 Japan ................................... 318/135

OTHER PUBLICATIONS

IBM TDB, vol. 15, No. 3, "Balanced Force Voice Coil Actuator", Frater, 8/72, p. 749.

Primary Examiner—Aristotelis M. Psitos
Assistant Examiner—Steven R. Garland
Attorney, Agent, or Firm—Antonelli, Terry, Stout & Kraus

[57] ABSTRACT

A magnetic disk apparatus capable of reducing the vibration thereof is disclosed, in which a linear access mechanism for driving a magnetic head is provided with anti-reaction force generating means for generating an anti-reaction force capable of offsetting a reaction force generated in driving a carriage mounted with the magnetic head.

12 Claims, 13 Drawing Sheets

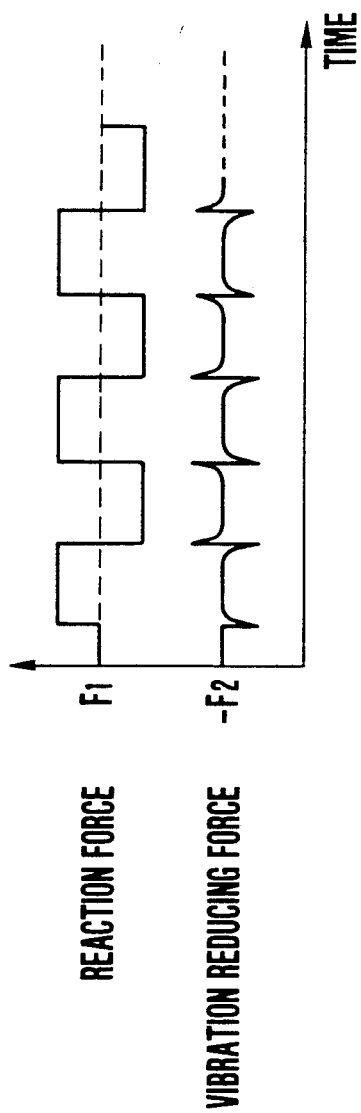
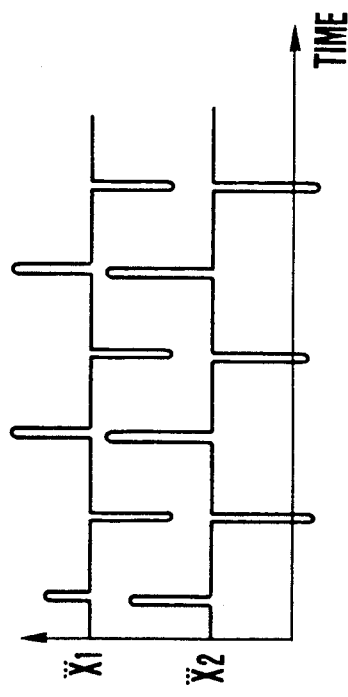

LINEAR ACCESS MECHANISM WITH DRIVING FORCE REACTION CANCELLING DEVICE AND MAGNETIC DISK APPARATUS USING THE SAME

BACKGROUND OF THE INVENTION

The present invention relates to a linear access mechanism which is used as positioning means in a magnetic disk apparatus, and more particularly to a linear access mechanism which is required to have a high positioning accuracy.

In a conventional magnetic disk apparatus having a linear access mechanism, a reaction force which is applied to the linear access mechanism as the reaction of a driving force is absorbed by the rigidity of the whole of the magnetic disk apparatus, or the linear access mechanism is provided with a reaction absorbing mechanism used in guns. The reaction absorbing mechanism utilizes the damping effect due to friction as described in a Japanese utility model application Laid-open No. 49-49,799, absorbs reaction by vibrating a striking piston and a reaction piston simultaneously so that a phase difference of 180° is generated therebetween as described in a Japanese Patent Application laid-open No. JP-A-58-132,470, or utilizes a reaction force due to the jet of a high pressure gas as described in a Japanese utility model Publication No. 49-9,680.

The linear access mechanism of a magnetic disk apparatus is driven at a mean frequency of 20 to 30 Hz in a seeking operation, and is driven at a frequency which is ten or more times higher than the above mean frequency in a following operation. In a case where the reaction force applied to the linear access mechanism is absorbed by the rigidity of the magnetic disk apparatus, the absorbing operation cannot follow such a wide frequency range. Moreover, abrasion is generated in a friction surface, and thus the reliability of the magnetic disk apparatus is degraded. Further, in a case where the reaction absorbing mechanism is used, the reaction absorbing mechanism cannot follow vibrations in such a wide frequency range, and moreover is readily affected by temperature.

SUMMARY OF THE INVENTION

An object of the present invention is to provide a linear access mechanism which can reduce an exciting force applied thereto to lessen the vibration of the whole of a magnetic disk apparatus, thereby enhancing the positioning accuracy of the linear access mechanism.

Another object of the present invention is to provide a magnetic disk apparatus whose vibration is greatly reduced.

According to an aspect of the present invention, there is provided a linear access mechanism including a carriage capable of moving linearly on a guide surface, a guide mechanism for guiding the carriage, a voice-coil motor for causing the carriage to make a linear reciprocating motion, and a base for supporting the guide mechanism and the voice-coil motor, which access mechanism comprises anti-reaction force generating means for generating an anti-reaction force capable of offsetting the reaction force of a driving force for driving the carriage, the point of action of the anti-reaction force lying on a straight line indicative of a direction in which the driving force is applied to the carriage.

According to another aspect of the present invention, there is provided a magnetic disk apparatus provided with an reaction-force reducing device for reducing a reaction force due to the driving force of a linear access mechanism by applying a force 180° out of phase with the reaction force to the linear access mechanism, wherein the reaction-force reducing device includes at least a pair of electrostrictive elements, a weight member interposed between the electrostrictive elements and held movably, and a driving device for driving the electrostrictive elements.

According to the present invention, a force equal in magnitude and opposite in direction to the reaction force of a driving force is applied to the driving part of a linear access mechanism to eliminate an exciting force applied to the driving part. Further, when an anti-reaction force generating mechanism is formed of a voice-coil motor, the anti-reaction force generating mechanism can follow various frequencies in a wide frequency range used for driving a magnetic head, and thus the exciting force applied to the driving part can be greatly reduced.

BRIEF DESCRIPTION OF THE DRAWINGS

FIG. 15 is a waveform chart showing the variation of each of a reaction force $F_1$ based upon a driving force and a vibration suppressing force $F_2$, with time.

FIG. 16 is a waveform chart showing the variation of each of the derivative of the acceleration of a voice-coil motor magnet with respect to time and the derivative of the acceleration of a weight member with respect to time, with time.

DESCRIPTION OF THE PREFERRED EMBODIMENTS

Figure 1:
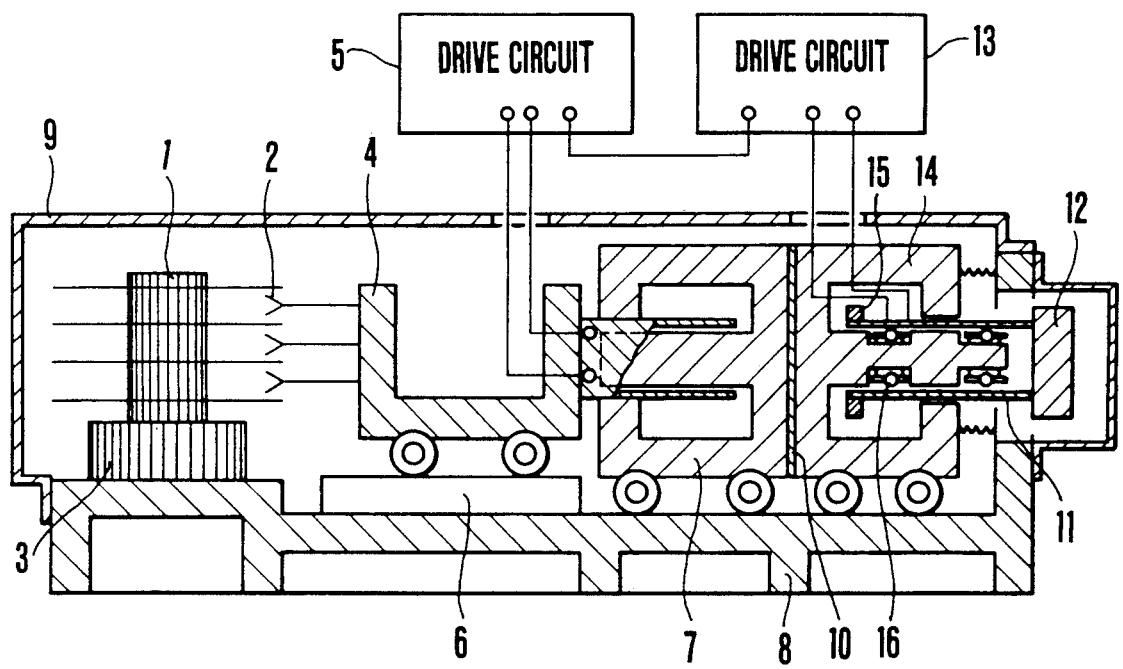
FIG. 1 is a longitudinal sectional view showing an embodiment of an inventive linear access mechanism included in a magnetic disk apparatus.

Now, explanation will be made of a magnetic disk apparatus which includes an embodiment of a linear access mechanism according to the present invention, with reference to FIG. 1. Referring to FIG. 1, the magnetic disk apparatus includes a magnetic head 2 for reading and writing data, a spindle 1 for holding and rotating a magnetic disk which stores data, a motor 3 for rotating the spindle 1, a carriage 4 for holding the head 2 and for performing an access operation, a voice-coil motor 7 for causing the carriage 4 to perform the access operation, a drive circuit 5 for driving the voice-coil motor 7, a base 8 for supporting the members 3, 4 and 7, and a cover 9 for shielding the members 1, 2, 3, 4 and 7 from the outside air, together with the base 8. Next, the operation of the magnetic disk apparatus will be explained below. The carriage 4 is driven by the voice-coil motor 7 so as to make a reciprocating motion on a guide path 6. Thus, data is written in or read out from the magnetic disk. In order to perform such a write or read operation for the magnetic disk, it is necessary to accurately locate the head 2 which is mounted on one end of the carriage 4 at a desired position on the magnetic disk. The positioning accuracy of the magnetic head 2 is not only dependent upon the accuracy at which the carriage 4 is guided by the guide path 6, but also depends upon the operating accuracy of the drive circuit 5 utilizing a position signal which is detected from the magnetic disk by the head 2. The positioning accuracy, however, is adversely affected by the reaction of a driving force for driving the carriage 4. That is, an exciting force due to the reaction of the driving force is applied to a driving part, and the vibration generated by the exciting force is propagated to the base 8. Thus, the spindle 1 vibrates. As a result, relative displacement of the magnetic disk and the head 2 is generated, which results in a positioning error. In order to solve this problem, an anti-reaction force generating device is added to the magnetic disk apparatus as shown in FIG. 1. The anti-reaction force generating device is made up of a reaction voice-coil motor 14 which is attached to the voice-coil motor 7 through a magnetic shielding material 10, a reaction carriage 11 driven by the reaction voice-coil motor 14, reaction weights 12 and 15 bonded to both ends of the reaction carriage 11, and a drive circuit 13 for driving the reaction carriage 11 and guide pulleys 16 which are used to guide the reaction carriage 11.

Next, explanation will be made of the operation of the anti-reaction force generating device. When the carriage 4 is driven, a reaction force is applied to the voice-coil motor 7. This reaction force causes the driving part to vibrate, and the vibration thus generated is propagated to various members. That is, the members vibrate. As a result, relative displacement of the head 2 and the magnetic disk is generated. Thus, the positioning accuracy of the head 2 is degraded, and a read/write error is generated. When a force for offsetting a reaction force which is generated in driving the carriage 4 is applied to the driving part at the same time as the reaction force is applied to the driving part, the driving part is apparently applied with no force. Thus, the vibration of the driving part is reduced, and the positioning accuracy of the head 2 is improved. The force for offsetting the reaction force, that is, an anti-reaction force, is generated by the anti-reaction force generating device. For example, a driving current for driving the carriage 4 is detected, and a current equal to the driving current is caused to flow through an anti-reaction force generating device which is equal in driving force to the driving part.

Further, when the mass of a movable part of the reaction carriage 11 is made larger than the mass of a movable part of the carriage 4, the stroke of the movable part of the reaction carriage 11 caused by a force is smaller than the stroke of the movable part of the carriage 4 caused by the same force as above, that is, the anti-reaction force generating device can be made small in size.

The driving current for driving the carriage 4 includes a current component with respect to the counter electromotive force of the voice-coil motor 7 and a noise component. The high-frequency disturbing component included in the driving current can vibrate the carriage 4. However, in a case where the high-frequency disturbing component of the driving current is propagated, as reaction, to the driving part, the high-frequency disturbing component is attenuated by a propagation path, and thus has no intermediate connection with the vibration of the driving part. Accordingly, it is not always required to indicate reaction which is generated in driving the carriage 4 by the driving current and to supply the driving current to the anti-reaction force generating device, but the anti-reaction force generating device may be applied with a current waveform which is obtained by removing a high-frequency component from the driving current, that is, a current component existing in the vicinity of a driving frequency.

In order to deliver an output signal corresponding to the anti-reaction force, the drive circuit 13 of FIG. 1 is applied with the driving current for driving the carriage 4, or a signal indicative of the acceleration of the driving part.

Figure 2:
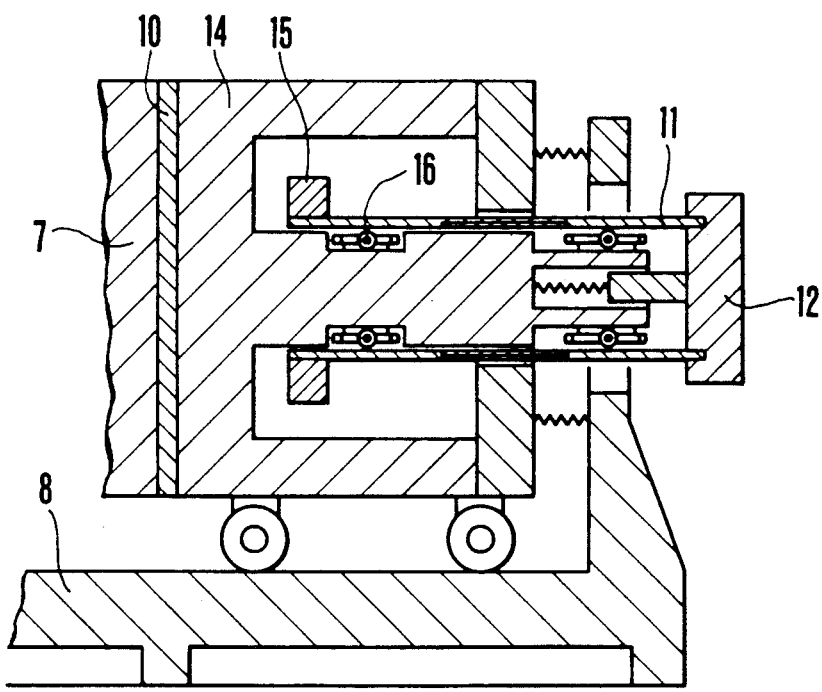
FIG. 2 is an enlarged view showing the anti-reaction force generating device of FIG. 1.
Figure 3:
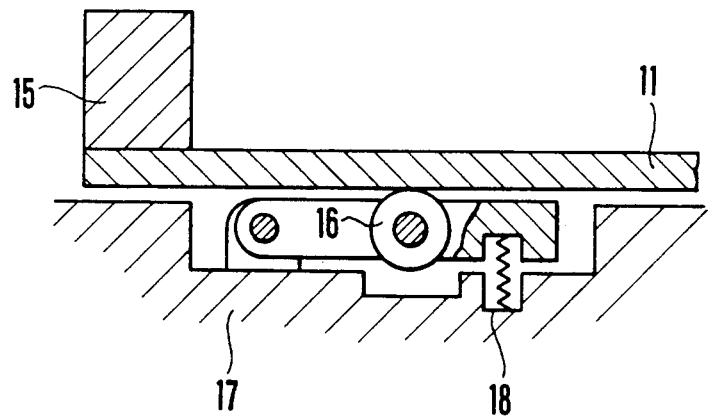
FIG. 3 is a longitudinal sectional view showing the guide mechanism for the reaction carriage of FIG. 1.

When the reaction force applied to the driving part is offset by the anti-reaction force, and both the driving part and the anti-reaction force generating device are placed movably on the base 8 as shown in FIG. 1, it is possible to drive the carriage 4 without propagating a force which is applied to the driving part, directly to the base 8. Thus, the vibration of the whole of the magnetic disk apparatus is reduced, and the positioning accuracy of the head 2 is improved. FIG. 2 is a sectional view showing the anti-reaction force generating device of FIG. 1 in more detail. As shown in FIG. 2, the anti-reaction force generating device includes the reaction voice-coil motor 14, the reaction carriage 11 which is driven by the reaction voice-coil motor 14, the reaction weights 12 and 15 bonded to both ends of the reaction carriage 11, and the guide pulleys 16 for guiding the reaction carriage 11. FIG. 3 is an enlarged view of the guide pulley of FIG. 3. In order to move the reaction carriage 11 smoothly in the air gap of the reaction voice-coil motor 14, it is necessary to use a guide mechanism for guiding the reaction carriage 11. The guide pulley 16 of FIG. 3 serves as the guide mechanism. Referring to FIG. 3, a pressure spring 18 presses the guide pulley 11 against the reaction carriage 11 in a direction from the inside of the reaction carriage 11 toward the outside thereof, to perform a guiding operation smoothly and stably. As shown in FIG. 3, the pressure spring 18 is inserted into a recess which is formed in the center pole 17 of the reaction voice-coil motor 14.

Figure 4:
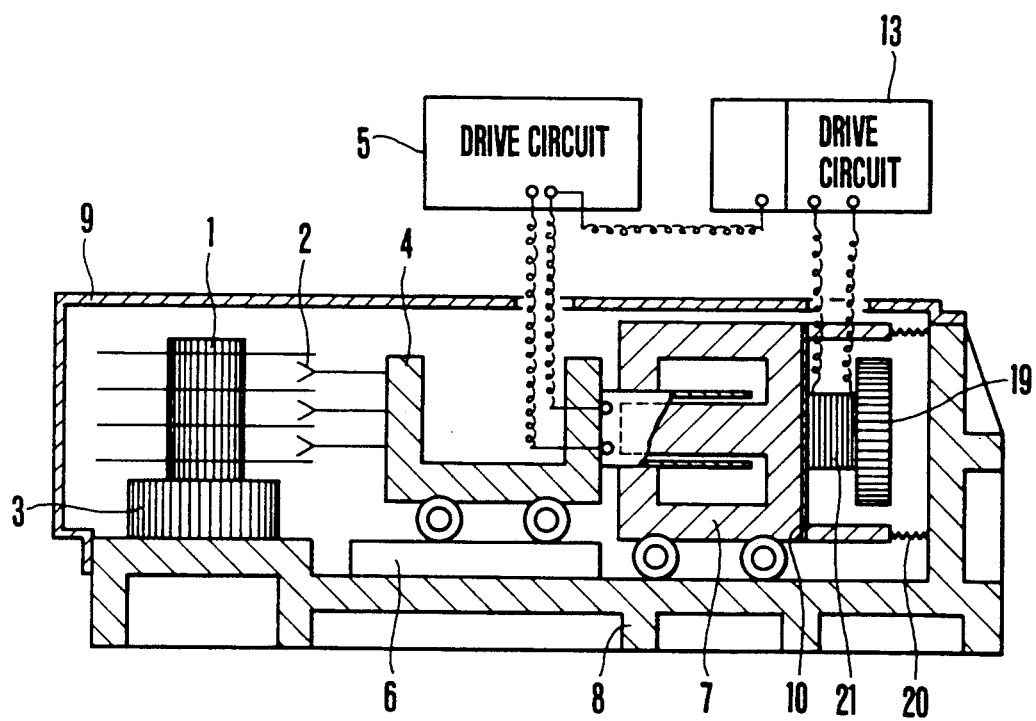
FIG. 4 is a longitudinal sectional view showing another embodiment of an inventive linear access mechanism included in a magnetic disk apparatus.
Figure 5:
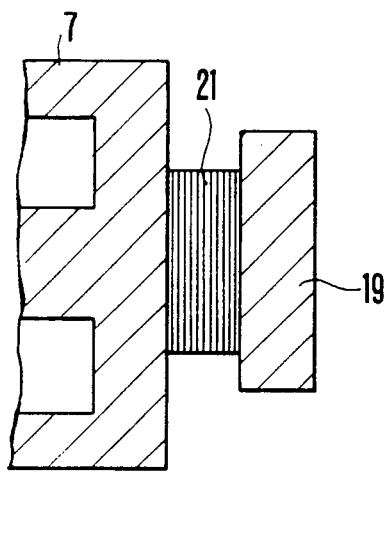
FIG. 5 is a longitudinal sectional view showing the anti-reaction force generating device of FIG. 4.

FIG. 4 shows a magnetic disk apparatus including another embodiment of a linear access mechanism according to the present invention. In the present embodiment, an anti-reaction force generating device is made up of a laminated electrostrictive element 21 which is attached to the voice-coil motor 7 through the magnetic shielding member 10, a reaction weight 19 bonded to the electrostrictive element 21 so that the laminated electrostrictive element 21 is interposed between the voice-coil motor 7 and the reaction weight 19, and a drive circuit 13 for controlling a voltage which is applied to the laminated electrostrictive element 21. The anti-reaction force generating device is operated as follows. A voltage is applied to the laminated electrostrictive element 21 so as to elongate and contract the laminated electrostrictive element at a high speed, thereby displacing the reaction weight 19 forcedly. When the above displacement of the reaction weight 19 is made in an accelerated manner, the force of inertia of the reaction weight 19 can be used as an anti-reaction force. However, the driving part of the linear access mechanism is movable for the base 8 as shown in FIG. 4, and hence the magnetic disk and others may be damaged by the movement of the driving part in a period when the magnetic disk apparatus is transported. In order to solve this problem, the driving part is coupled with the base 8 through a spring member 20. The above anti-reaction force generating device can respond to high frequencies, and can generate a strong anti-reaction force. Further, there is no fear of generating abrasion because of the absence of a driving mechanism, and the anti-reaction force generating device is small in size, since the reaction weight 19 is driven by the laminated electrostrictive element 21. FIG. 5 is an enlarged view showing the anti-reaction force generating device of FIG. 4. As shown in FIG. 5, the anti-reaction force generating device includes the laminated electrostrictive element 21 attached to the voice-coil motor 7, and the reaction weight 19 bonded to the laminated electrostrictive element 21. The laminated electrostrictive element 21 is formed by stacking a plurality of circular or polygonal electrostrictive elements. The deformation of the laminated electrostrictive element 21 is used for moving the reaction weight 19 in an accelerated manner, and the force of inertia of the reaction weight 19 is used as an anti-reaction force.

Figure 6:
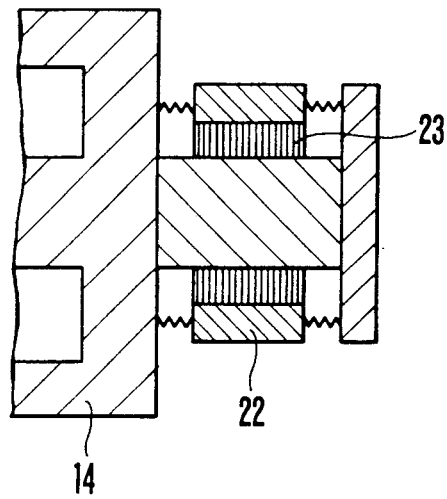
FIG. 6 is a longitudinal sectional view showing the anti-reaction force generating device of a further embodiment of an inventive linear access mechanism.
Figure 7:
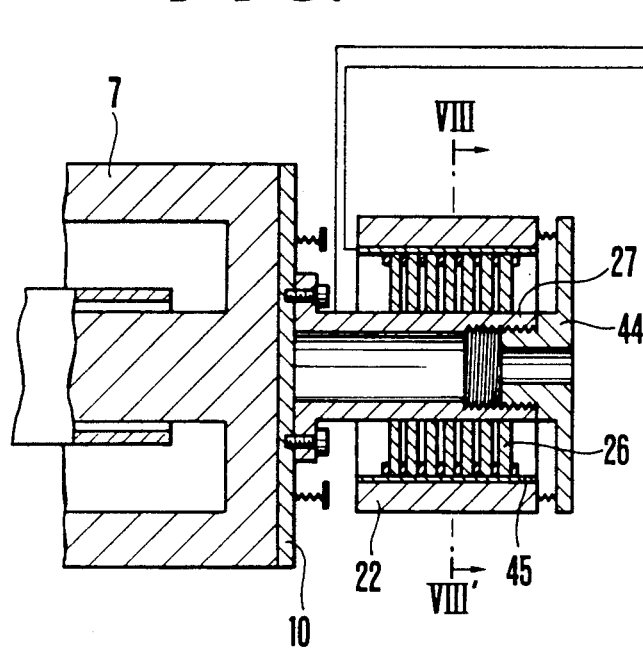
FIG. 7 is a longitudinal sectional view showing an improved version of the anti-reaction force generating device of FIG. 6.

FIG. 6 shows an anti-reaction force generating device included in a further embodiment of a linear access mechanism according to the present invention. In this anti-reaction force generating device, a plurality of annular electrostrictive elements are coaxially stacked to form a laminated electrostrictive element 23, and the inner or outer peripheral surface of the laminated electrostrictive element 23 is used for driving a reaction weight 22. This anti-reaction force generating device is advantageous in that the stroke of the reaction weight 22 can be made far larger than the amount of deformation of the laminated electrostrictive element 23. FIG. 7 is a sectional view showing an improved version of the anti-reaction force generating device of FIG. 6 in detail. This anti-reaction force generating device includes a laminated electrostrictive element 26 moving on a motor guide 27 which is attached to the voice-coil motor 7 through the magnetic shielding member 10 in an axial direction, a reaction weight 22 which is fixed to the outer periphery of the laminated electrostrictive element 26 through an insulating layer 45, and a stopper 44 for the reaction weight 22. The operation principle of this anti-reaction force generating device is as follows. Referring to FIG. 7, when a voltage is applied to individual electrostrictive elements of the laminated electrostrictive element 26 so that a strain is generated in each electrostrictive element in the radial direction thereof and a phase difference is generated between adjacent electrostrictive elements, the strain which is generated in the laminated electrostrictive element 26 in the radial direction thereof forms a traveling wave. In FIG. 7, the outer peripheral surface of the laminated electrostrictive element 26 is fastened to the reaction weight 22 through the insulating layer 45. Accordingly, the traveling wave is generated at the inner peripheral surface of the laminated electrostrictive element. Thus, the reaction weight 22 and the laminated electrostrictive element 26 move on a motor guide 27 in the axial direction thereof. In a case where electrostrictive elements are stacked and the strain in the electrostrictive elements in the stacking direction is utilized to move a reaction weight, a very large number of electrostrictive elements has to be stacked to obtain a large strain. In contrast, in the anti-reaction force generating device of FIG. 7, the stroke of the reaction weight can be made large by a relatively small number of electrostrictive elements.

Figure 8:
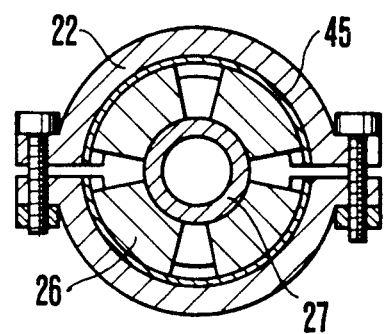
FIG. 8 is a sectional view taken along the line VIII-–VIII' of FIG. 7.

FIG. 8 is a sectional view taken along the line VIII-–VIII' of FIG. 7. As shown in FIG. 8, each laminated electrostrictive element 26 is formed by stacking a plurality of sector-shaped electrostrictive elements, and the reaction weight 22 is bolted so as to be pressed against the surface of the motor guide 27 through a plurality of laminated electrostrictive elements. In operation, the laminated electrostrictive elements make a motion similar to the walk of a measuring worm. That is, the contact friction between the motor guide 27 and the laminated electrostrictive elements 26 due to the pressure of the reaction weight 22 is utilized to move the laminated electrostrictive elements and the reaction weight.

Figure 9:
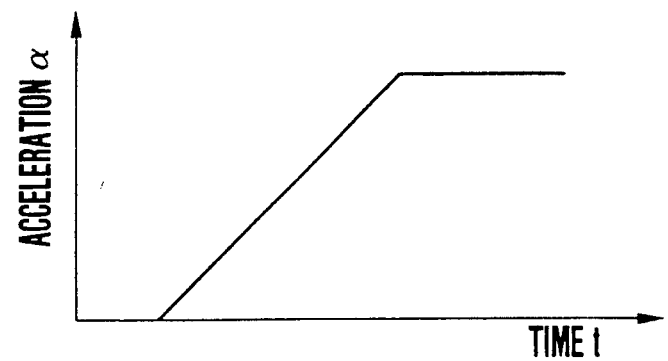
FIG. 9 is a graph showing the variation of the acceleration of the driving part of a linear access mechanism due to the reaction of a driving force, with time.
Figure 10:
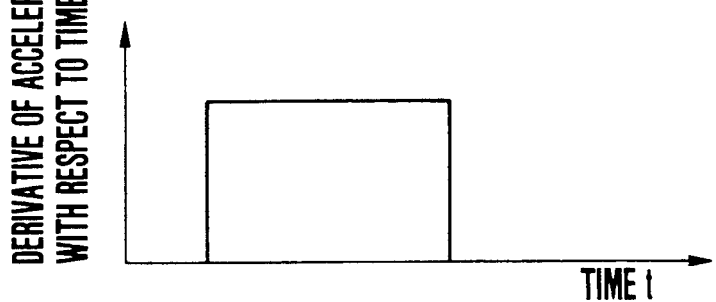
FIG. 10 is a graph showing the variation of the derivative of the acceleration of FIG. 9 with respect to time, with time.
Figure 11:
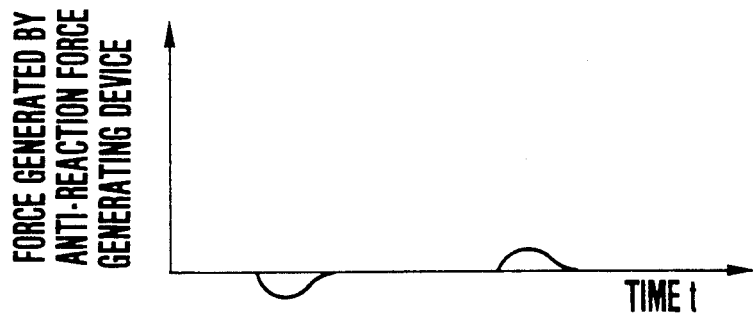
FIG. 11 is a graph showing the variation of a force generated by an anti-reaction force generating device, with time.
Figure 12:
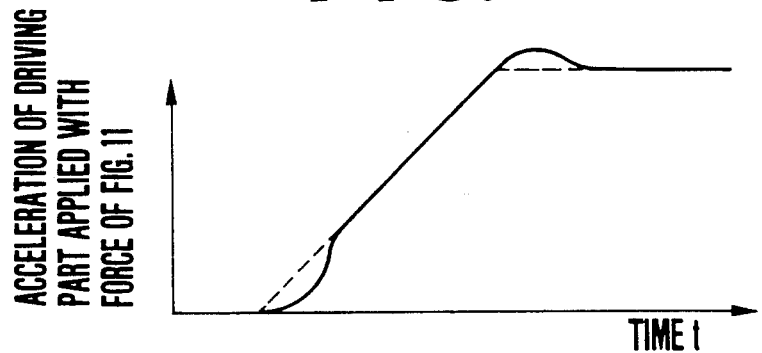
FIG. 12 is a graph showing the variation of the acceleration of the driving part applied with the force of FIG. 11, with time.

FIGS. 9 to 12 are graphs concerning the operation of the driving part. FIG. 9 shows the variation of the acceleration α of the driving part due to the reaction force of a driving force for driving the carriage 4, with time. FIG. 10 shows the variation of the derivative of the acceleration of the driving part with respect to time, with time. FIG. 11 shows the variation of a force generated by the anti-reaction generating device, with time. FIG. 12 shows the variation of the acceleration of the driving part which is applied with both the reaction force of a driving force for driving the carriage 4 and the force generated by the anti-reaction force generating device, with time. When an abrupt change in acceleration of the driving part is made smooth by using the force of FIG. 11, the application of an impulsive force to the driving part can be avoided, and thus the vibration of the access mechanism can be reduced. Accordingly, the vibration of the whole of the magnetic disk apparatus can be reduced, and the positioning accuracy of the access mechanism can be improved.

Next, explanation will be made of how to determine the waveform of the force generated by the anti-reaction force generating device.

Let us express the acceleration α of the driving part due to the reaction force by a linear function of time, as shown in FIG. 9. Then, the acceleration α is given by the following equation:

$$\alpha = K_1 t + K_0 \quad (1)$$

where $K_1$ indicates a proportional constant, $K_0$ a constant, and t time.

Further, let us express the acceleration α' of the driving part due to the force generated by the anti-reaction force generating device by the following cubic equation:

$$\alpha' = at^3 + bt^2 + ct + d \quad (2)$$

In order to smoothly combine two kinds of acceleration α and α' with each other, it is necessary to satisfy the following conditions:

$\alpha = \alpha'$ and $d\alpha/dt = d\alpha'/dt$ for $t=0$,
$\alpha' = 0$ and $d\alpha'/dt = 0$ for $t=t_0$ By using the above conditions in the equations (1) and (2), we can obtain the following equations:

$$a = -\frac{-K_1}{t_0^2} \quad (3)$$

$$b = -\frac{2K_1}{t_0} \quad (4)$$

$$c = -K_1 \quad (5)$$

$$d = 0 \quad (6)$$

That is, constants a, b, c and d can be determined as mentioned above. As can be seen from the equations (1) to (6), the acceleration α' is proportional to the derivative of the acceleration α with respect to time. In other words, the vibration of the access mechanism can be reduced by applying a force which is proportional to the derivative of the acceleration α due to the reaction force with respect to time to the driving part.

Figure 13:
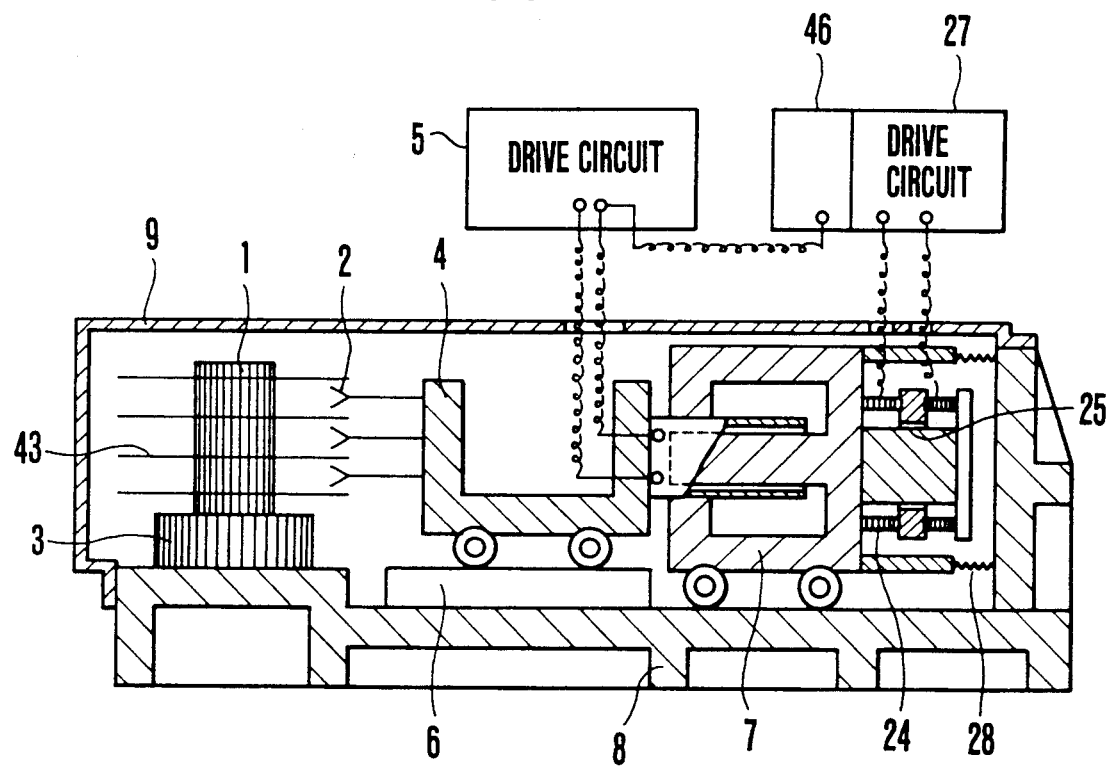
FIG. 13 is a longitudinal sectional view showing still another embodiment of an inventive linear access mechanism included in a magnetic disk apparatus.

Next, explanation will be made of a magnetic disk apparatus which includes still another embodiment of a linear access mechanism according to the present invention, with reference to FIG. 13. Referring to FIG. 13, the magnetic disk apparatus includes a head 2 for reading and writing data, a spindle 1 for holding and rotating a magnetic disk 43 which stores data, a motor 3 for rotating the spindle 1, a carriage 4 for holding the head 2 and for performing an access operation, a voice-coil motor 7 for causing the carriage 4 to perform the access operation, a control circuit 5 for driving the voice-coil motor 7, a base 8 for supporting the members 3, 4 and 7, and a cover 9 for shielding the members 1, 2, 3, 4, 7 and 43 from the outside air, together with the base 8. Next, the operation of the magnetic disk apparatus will be explained below. The carriage 4 is driven by the voice-coil motor 7 so as to make a reciprocating motion on a guide path 6. Thus, data is written in or read out from the magnetic disk 43. In order to perform such a write or read operation, it is necessary to accurately locate the head 2 which is mounted on one end of the carriage 4, at a desired position on the magnetic disk 43. The positioning accuracy of the head 2 is not only dependent on the accuracy at which the carriage 4 is guided by the guide path 6, but also depends upon the operating accuracy of the control circuit 5 utilizing a position signal which is detected from the magnetic disk by the head 2. The positioning accuracy, however, is adversely affected by a reaction force which is generated in driving the carriage 4. That is, owing to the above reaction force, a driving part vibrates. The vibration of the driving part is propagated to the base 8, and thus the spindle 1 vibrates. As a result, relative displacement of the magnetic disk 43 and the head 2 is generated, which results in a positioning error. In order to solve this problem, a reaction-force reducing device is added to the magnetic disk apparatus as shown in FIG. 13. The reaction-force reducing device has a structure that a weight member 25 is inserted between a pair of laminated electrostrictive elements 24, and such a series combination of the weight member 25 and the laminated electrostrictive elements 24 is attached to the voice-coil motor 7. Further, the reaction-force reducing device includes a drive circuit 27 for driving the laminated electrostrictive elements 24 in accordance with the reaction force. In more detail, at least one electrostrictive element is arranged on both sides of the weight member 25 so as to form a pair of laminated electrostrictive elements 24 having the same number of electrostrictive elements, and one end of each of the laminated electrostrictive elements 24 is fixed to the voice-coil motor 7. Thus, the weight member 25 can make a reciprocating motion together with the laminated electrostrictive elements 24. It is needless to say that the direction of the accelerated motion of the weight member 25 agrees with the direction of the displacement of the laminated electrostrictive elements 24. The motion of the weight member 25 produces a force. In order to reduce a reaction force which is applied to a driving part on the basis of a driving force, the direction of the accelerated motion of the weight member 25 is made to agree with the direction of the reaction force.

Figure 14:
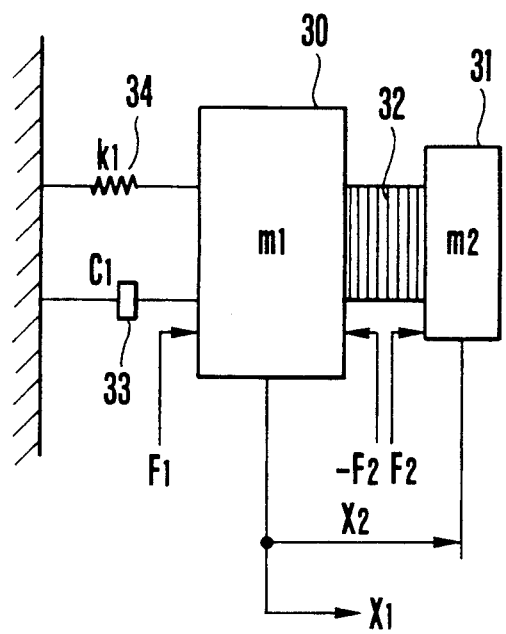
FIG. 14 is a schematic diagram showing a model for explaining the principle of vibration proofing.

Now, the principle of vibration proofing (that is, vibration control) will be explained. FIG. 14 shows a model used for explaining the principle of vibration proofing. Referring to FIG. 14, a voice-coil motor magnet 30 having a mass $m_1$, is supported by a spring element 34 and a damping element 33. Further, one end of a laminated electrostrictive element 32 is bonded to the voice-coil motor magnet 30, and the other end of the laminated electrostrictive element 32 is bonded to a weight member 31 having a mass $m_2$. When a reaction force $F_1$ is applied to the motor magnet 30, the motor magnet 30 is displaced. In a case where the reaction force $F_1$ is vibrational, the motor magnet vibrates. The vibration of the motor magnet can be reduced by weakening the reaction force $F_1$. In a case where the reaction force $F_1$ includes only a D.C. component, however, the motor magnet does not vibrate. Accordingly, the vibration of the motor magnet can be prevented by removing an A.C. component (that is, oscillatory component) from the reaction force $F_1$. In other words, the vibration of the motor magnet can be suppressed by feeding a quantity proportional to the derivative of the reaction force $F_1$ with respect to time (namely, a quantity proportional to the derivative of the acceleration of the voice-coil motor magnet 30 with respect to time) back to the motor magnet 30. When a force for reducing vibration is expressed by $F_2$, the above vibration reducing operation can be expressed as follows:

$$(m_1+m_2)\ddot{X}_1 + C_1 X + k_1 \dot{X}_1 = F_1 - F_2 \qquad (7)$$

$$\ddot{X}_2 = K \ddot{X}_1 \qquad (8)$$

FIG. 15 is a waveform chart showing an example of the variation of each of the reaction force $F_1$ and the vibration reducing force $F_2$ with time. The vibration reducing force $F_2$ is required to be applied effectively on the motor magnet 30 at a time the reaction force changes abruptly. Accordingly, the vibration reducing force $F_2$ has the waveform shown in FIG. 15. FIG. 16 is a waveform chart showing an example of the variation of each of the derivative of the acceleration $\ddot{X}_1$ of the motor magnet 30 with respect to time and the derivative of the acceleration $\ddot{X}_2$ of the weight member 30 with respect to time, with time.

Next, explanation will be made of how to generate the vibration reducing force shown in FIG. 15. Referring back to FIG. 14, when the weight member 31 having a mass $m_2$ makes an accelerated motion, the force of inertia $F_c (= m_2 X)$ is generated. The reaction force based upon the accelerated motion of the weight member can be used as the vibration reducing force $F_2$ of FIG. 15. When the laminated electrostrictive element 32 shown in FIG. 14 is deformed in an accelerating manner, the weight member 31 can perform an accelerated motion. In a case where the laminated electrostrictive element 32 is formed of, for example, a piezoelectric element, the electrostrictive element 32 can respond to high frequencies, and hence can produce a vibration reducing force for a high-frequency vibrational component. A portion of the force of inertia obtained by causing the weight member 31 to perform an accelerated motion can be used as the vibration reducing force $F_2$ which is given by the following equation:

$$F_2 = \frac{m_2}{1 + \frac{m_2}{m_1}} \ddot{X}_2 \qquad (9)$$

Figure 17:
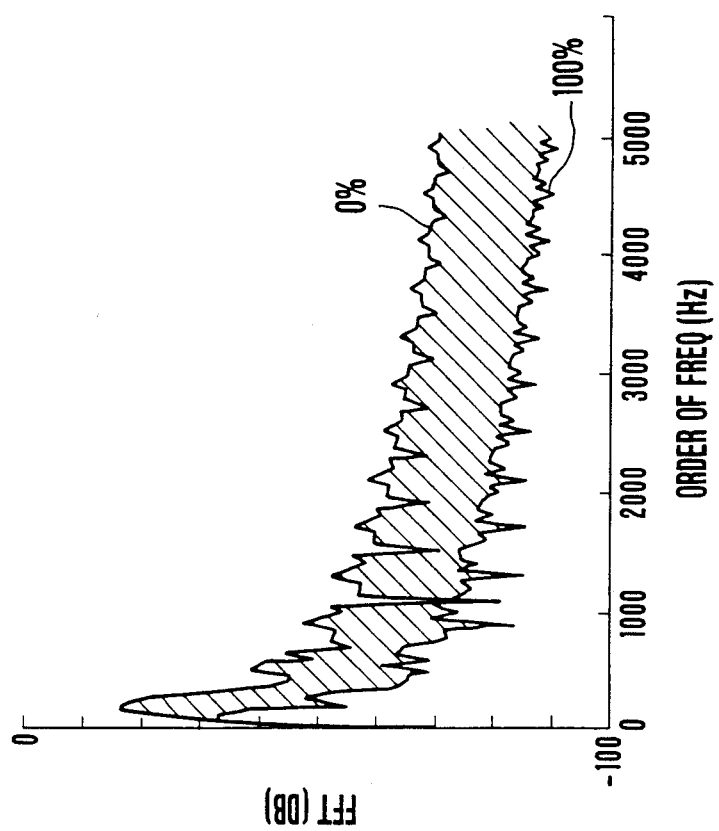
FIG. 17 is a graph showing acceleration waveforms of a voice-coil motor magnet applied with a vibration suppressing force which waveforms are obtained by calculation.

FIG. 17 shows the variation of the acceleration of the motor magnet 30 with time. It is to be noted that the acceleration waveforms of FIG. 17 are obtained by calculation using the equations (7) to (9). As shown in FIG. 17, the maximum value of the acceleration decreases as the fed-back quantity (that is the, vibration reducing force) becomes larger.

Figure 18:
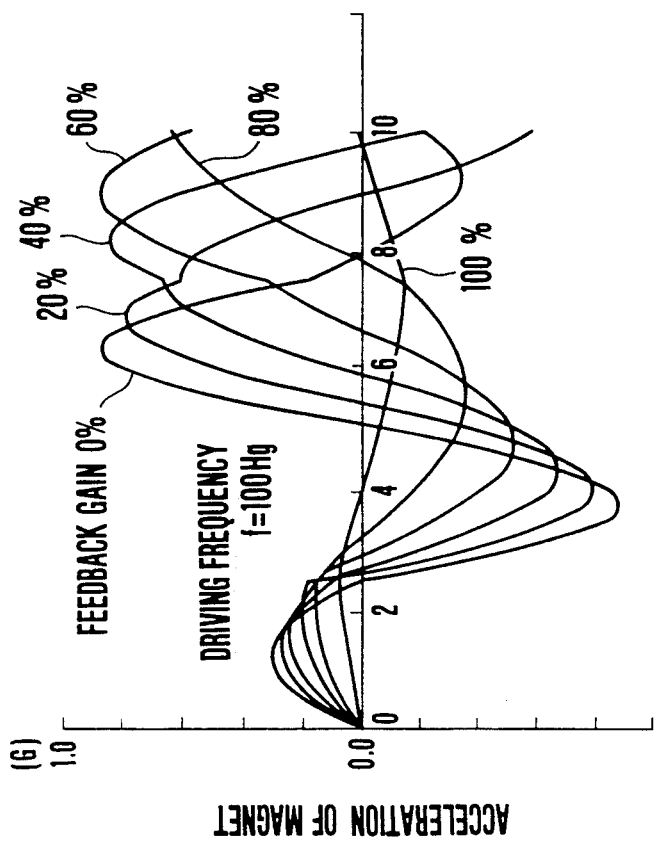
FIG. 18 is a graph showing frequency components which are contained in each of two acceleration waveforms shown in FIG. 17.

FIG. 18 shows the difference between the frequency components of the acceleration of the motor magnet applied with the vibration reducing force and the frequency components of the acceleration of the motor magnet applied with no vibration reducing force. When the vibration reducing force is applied to the motor magnet, the frequency components of the acceleration of the motor magnet are reduced as shown in FIG. 18.

In the above, explanation has been made of a method of driving the reaction-force reducing device. Next, explanation will be made of the circuit construction of a control circuit for driving the reaction-force reducing device.

Figure 19:
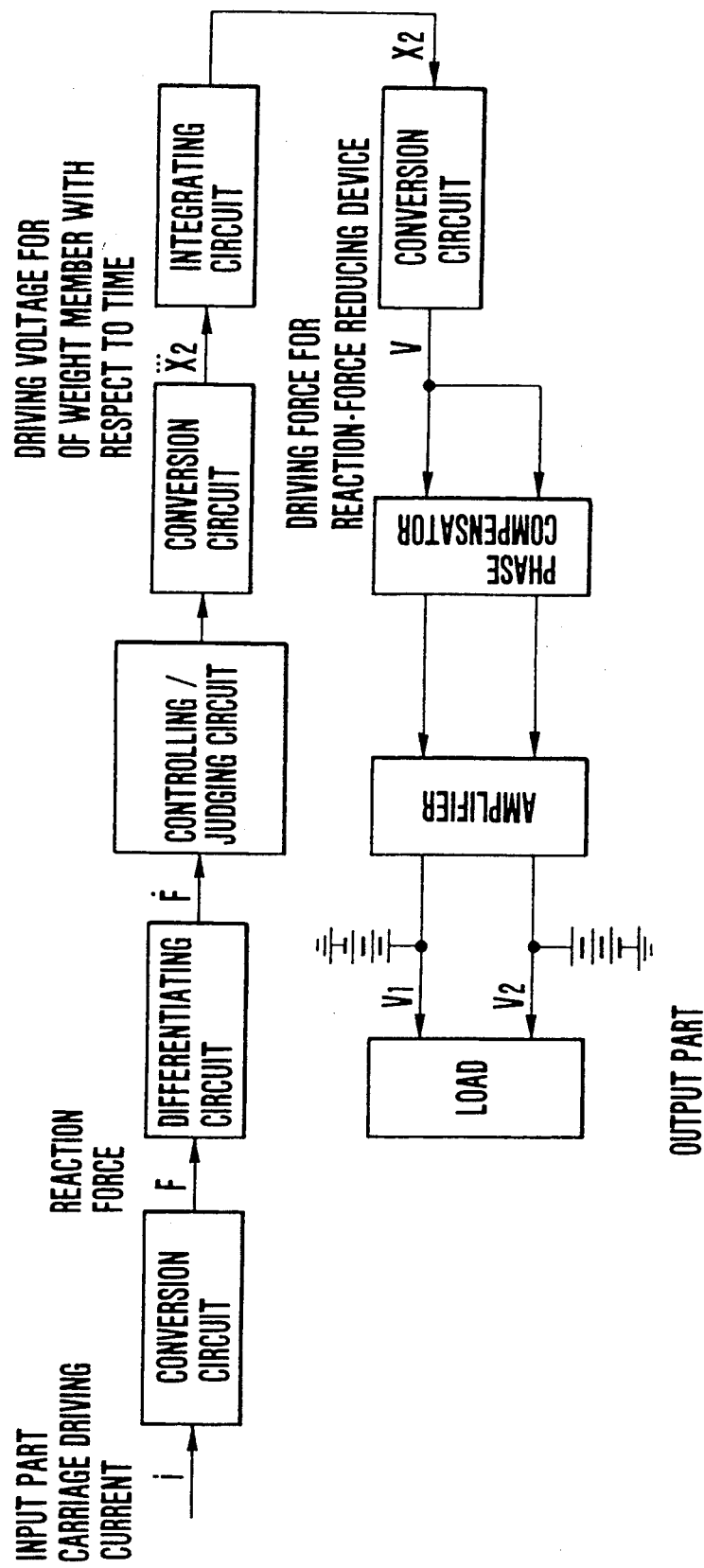
FIG. 19 is a block diagram showing an example of a control circuit for preventing vibration.

FIG. 19 shows an example of a control circuit for driving the reaction-force reducing device. Referring to FIG. 19, a carriage driving current i is applied, as an input signal, to a conversion circuit to be converted into a reaction force F. The reaction force F thus obtained is applied to a differentiating circuit to obtain the derivative of the reaction force with respect to time, which corresponds to the derivative of the acceleration of the voice-coil motor magnet with respect to time. When it is judged by a judging/controlling circuit that the absolue value of the derivative of the reaction force with respect to time exceeds a predetermined value, a control operation is performed. That is, the derivative of the reaction force with respect to time is converted by a conversion circuit into the derivative of the desired acceleration of the weight member with respect to time, which is applied to an integrating circuit to obtain the displacement $X_2$ of the weight member. The displacement $X_2$ of the weight member is converted by a conversion circuit into a voltage V which is to be applied to the laminated electrostrictive element to produce the displacement $X_2$ of the weight member. The voltage V is amplified by an amplifier, and then applied to a load (namely, the laminated electrostrictive element). A phase compensator shown in FIG. 19 is provided for the following reason. For example, in a case where the control circuit of FIG. 19 is used for the reaction-force reducing device of FIG. 13, one laminated electrostrictive element of the pair of laminated electrostrictive elements elongates and the other laminated electrostrictive element contracts. Thus, the weight member 25 is moved. When the starting time of elongation of the one laminated electrostrictive element is earlier than the starting time of contraction of the other laminated electrostrictive element, an abnormal force is applied to the weight member and the laminated electrostrictive elements. In order to prevent the generation of the abnormal force, it is necessary to make the starting time of contraction equal to or slightly earlier than the starting time of elongation. The phase compensator of FIG. 19 makes it possible to perform such an operation. The control circuit of FIG. 19 is advantageous in that the carriage driving current is readily detected, and sensors such as an accelerometer are unnecessary.

Figure 20:
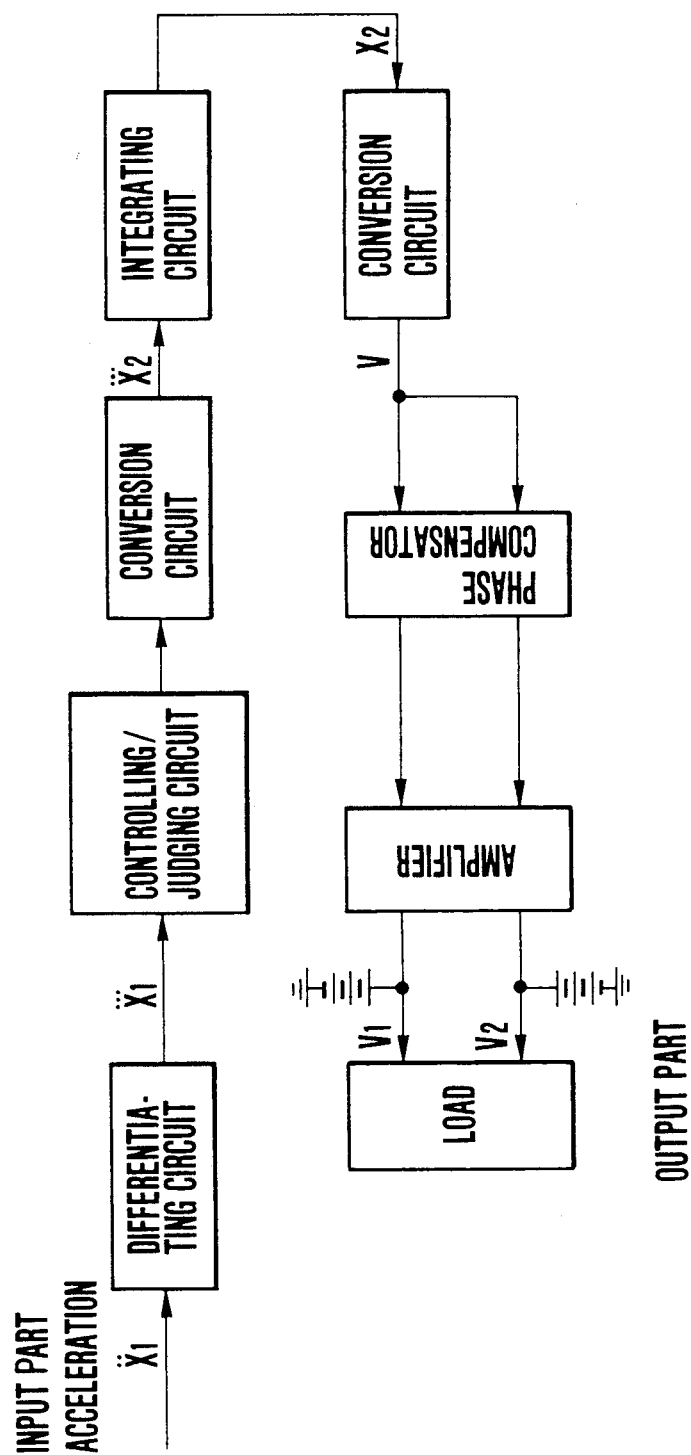
FIG. 20 is a block diagram showing another example of a control circuit for preventing vibration.

FIG. 20 shows another example of a control circuit for driving the reaction-force reducing device. Referring to FIG. 20, the acceleration $X_1$ of the voice-coil motor magnet is applied, as an input signal, to a differentiating circuit, and the derivative of the acceleration $X_1$ with respect to time is applied to a judging/controlling circuit to judge whether or not a control operations is to be performed. Other circuit parts in FIG. 20 perform the same operation as in the control circuit of FIG. 19. The control circuit of FIG. 20 necessitates an acceleration sensor but dispenses with a conversion circuit shown in FIG. 19 for converting the carriage driving current i into the reaction force F. Hence, the control circuit of FIG. 20 is smaller in number of constituent circuits than the control circuit of FIG. 19.

Figure 21:
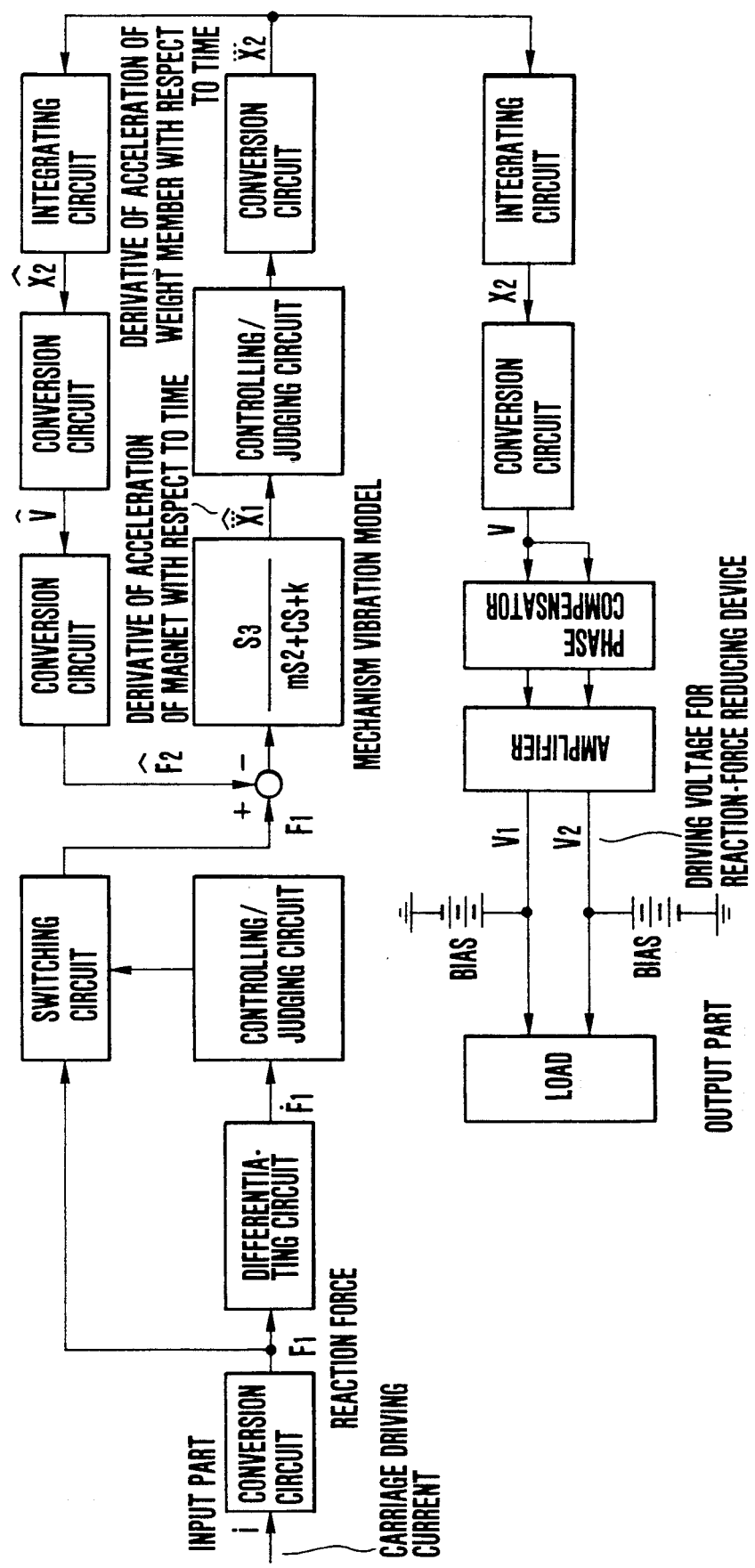
FIG. 21 is a block diagram showing a further example of a control circuit for preventing vibration.

FIG. 21 shows a further example of a control circuit for driving the reaction-force reducing device. The control circuit of FIG. 21 is different from the control circuit of FIG. 19 in that a model of an access mechanism is incorporated in the control circuit of FIG. 21 to obtain a vibration reducing force $\tilde{F}_2$. Other circuit parts in FIG. 21 perform the same operations as in the control circuit of FIG. 19. The control circuit of FIG. 21 dispenses with the acceleration sensor, and moreover can perform a stable operation.

Figure 22:
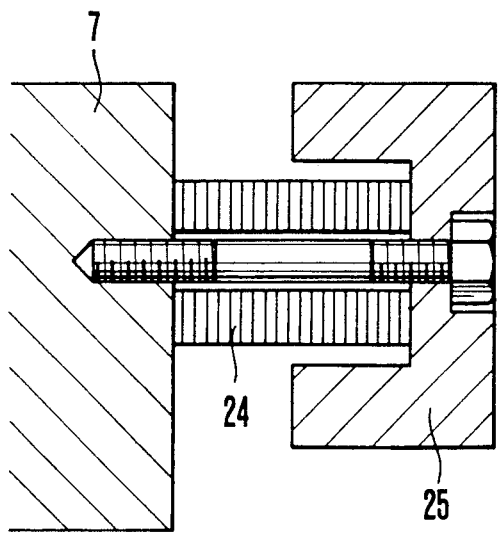
FIG. 22 is a longitudinal sectional view showing a reaction-force reducing device which is made up of a single laminated electrostrictive element and a single weight member.
Figure 23:
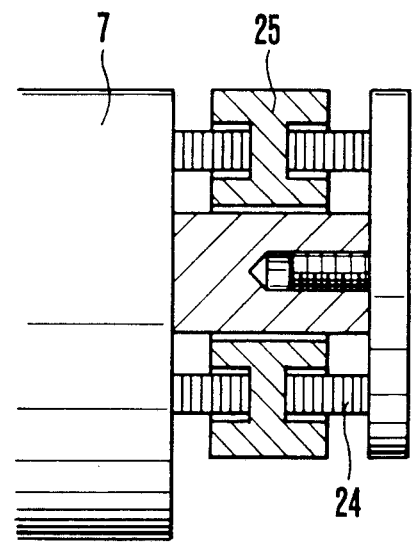
FIG. 23 is a longitudinal sectional view showing an embodiment of a reaction-force reducing device according to the present invention.
Figure 24:
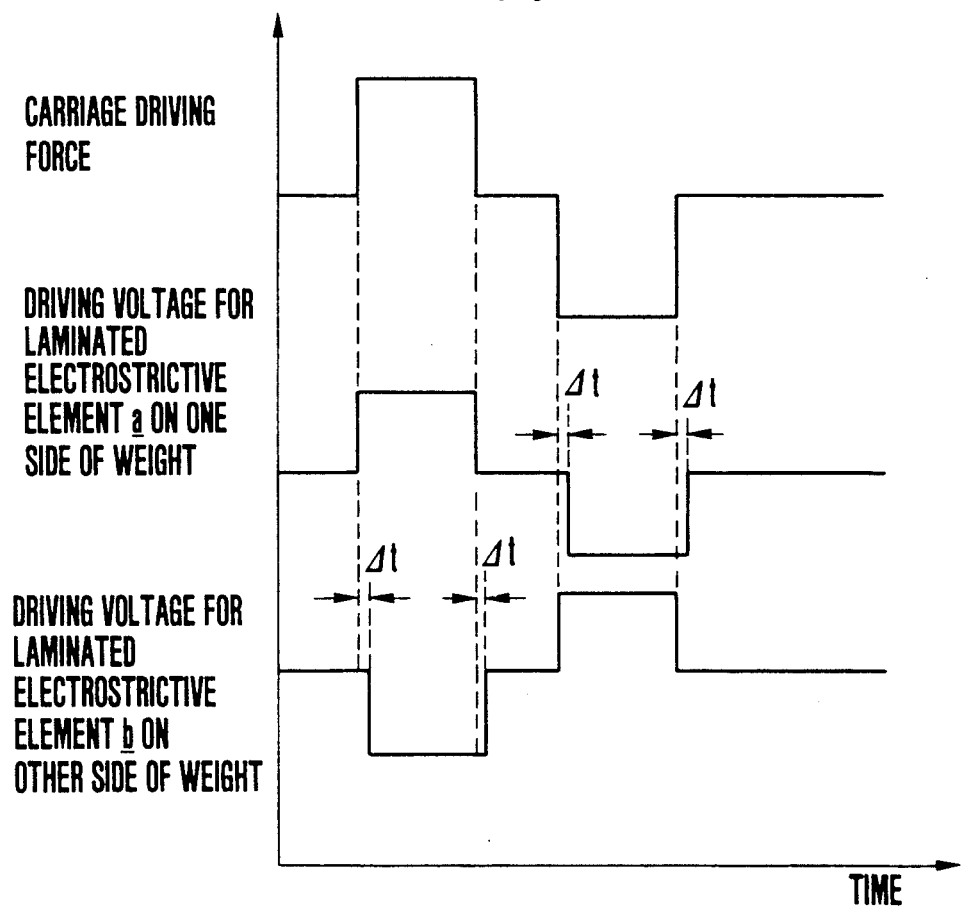
FIG. 24 is a waveform chart showing a method of driving the embodiment of FIG. 23.
Figure 29:
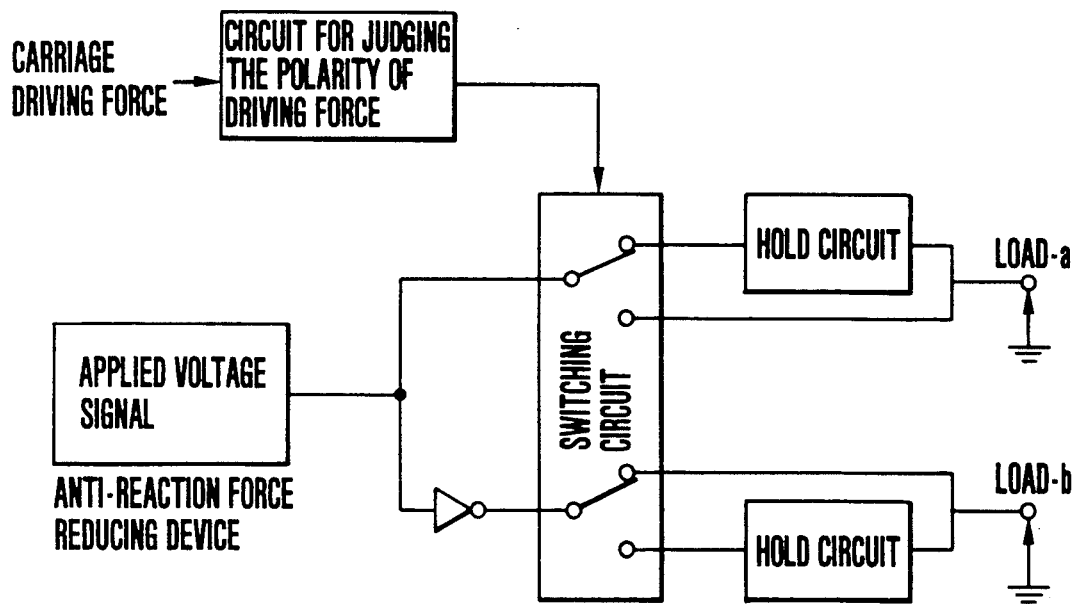
FIG. 29 is a block diagram which shows a control circuit for driving a pair of laminated electrostrictive elements in the manner shown in FIG. 24.

FIG. 22 shows a reaction-force reducing device, in which the laminated electrostrictive element 24 is provided only on one side of the weight member 25. Referring to FIG. 22, the weight member 25 is supported by a bolt so as to apply pressure on the laminated electrostrictive element 24. In this state, the laminated electrostrictive element 24 elongates and contracts to cause the weight member 25 to make an accelerated motion. In this case, the motion of the weight member 25 is unstable. Further, when the weight member 25 moves to the right, tension is applied to the laminated electrostrictive element 24. In general, it is undesirable to apply tension to a laminated electrostrictive element. Accordingly, it is desirable to use a reaction-force reducing device having the structure of FIG. 13. FIG. 23 is an enlarged view of the reaction-force reducing device shown in FIG. 13. Referring to FIG. 23, a pair of laminated electrostrictive elements 24 are arranged so that the weight member 25 is sandwiched between the laminated electrostrictive elements 24. Further, the weight member 25 and the laminated electrostrictive elements 24 are held so as to apply pressure on the end face of the voice-coil motor 7. In this state, the laminated electrostrictive elements are elongated and contracted to move the weight member 25. In more detail, the laminated electrostrictive elements 24 on both sides of the weight member 25 are applied with the same bias voltage and further applied with positive and negative voltages to elongate one of the laminated electrostrictive elements and to contract the other laminated electrostrictive element. When the laminated electrostrictive elements 24 on both sides of the weight member 25 are simultaneously deformed so as to be opposite in phase of deformation to each other, tension is not applied to the laminated electrostrictive elements 24. In order to surely prevent the generation of tension, the laminated electrostrictive elements on both sides of the weight member 25 are made slightly different in starting time of deformation from each other. FIG. 24 shows an example of such an operation of the laminated electrostrictive elements 24. In a case where the weight member 25 of FIG. 23 is moved to the right, the starting time of the elongation of the laminated electrostrictive element a provided on the left side of the weight member 25 is made slightly earlier than the starting time of the contraction of the laminated electrostrictive element b provided on the right side of the weight member 25. FIG. 29 shows a control circuit for driving the laminated electrostrictive elements, in the above-mentioned manner. In a case where the starting time of deformation of the laminated electrostrictive element a is made earlier than the starting time of deformation of the laminated electrostrictive element b for the carriage driving force in a positive direction, the holding time of a driving voltage for the element b is increased. In contrast, in a case where the starting time of deformation of the element b is made earlier than the starting time of deformation of the element a for the carriage driving force in a negative direction, the holding time of a driving voltage for the element a is increased.

Figure 25:
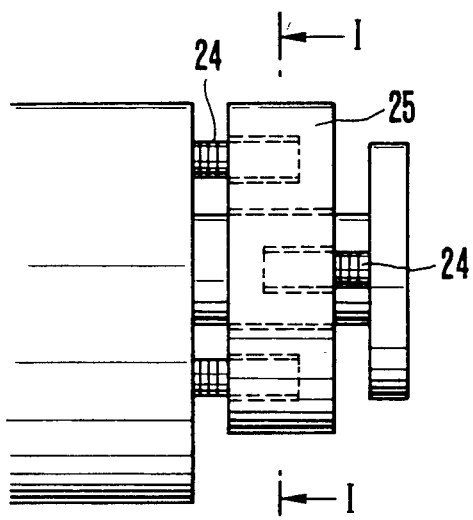
FIG. 25 is a longitudinal sectional view showing another embodiment of a reaction-force reducing device according to the present invention.
Figure 26:
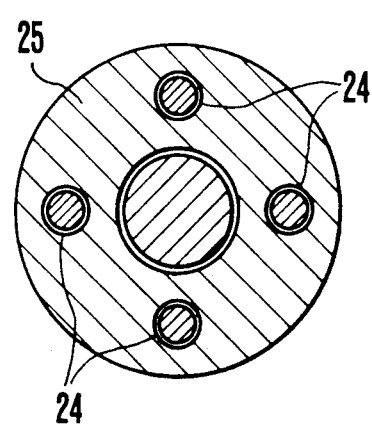
FIG. 26 is a sectional view taken along the line I—I of FIG. 25.

FIG. 25 shows another embodiment of a reaction-force reducing device according to the present invention, and FIG. 26 is a sectional view taken along the line I—I of FIG. 25. Referring to FIGS. 25 and 26, a plurality of laminated electrostrictive elements 24 are provided on both sides of the weight member 25 so that a laminated electrostrictive element on the left side of the weight member 25 and a laminated electrostrictive element on the right side of the weight member 25 are alternately arranged around the center axis of the reaction-force reducing device. In other words, two laminated electrostrictive elements 24 on one side of the weight member 25 are arranged so as to be symmetrical with respect to the center axis, and two laminated electrostrictive elements 24 on the other side of the weight member 25 are also arranged so as to be symmetrical with respect to the center axis. The reaction-force reducing device of FIGS. 25 and 26 performs the same operation as the operation of the reaction-force reducing device of FIG. 23. According to the above arrangement of laminated electrostrictive elements, the distance between the laminated electrostrictive elements 24 on the left side of the weight member 25 and the laminated electrostrictive elements 24 on the right side of the weight member 25 can be reduced by an amount corresponding to the thickness of the weight member 25. Thus, the reaction-force reducing device can be made small in size.

Figure 27:
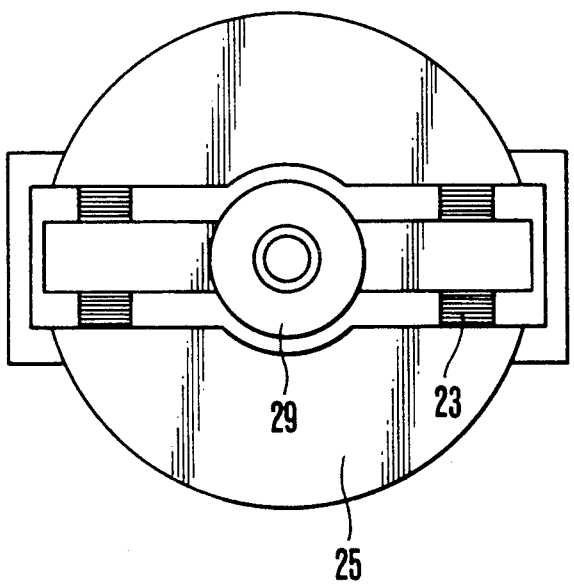
FIG. 27 is a plan view showing a further embodiment of a reaction-force reducing device according to the present invention which embodiment is a device of the rotary type.

FIG. 27 is a plan view showing a further embodiment of a reaction-force reducing device according to the present invention, which embodiment can be used in an access mechanism of the rotary type. Referring to FIG. 27, at least a pair of laminated electrostrictive elements, for example, two pairs of laminated electrostrictive elements 24, are provided at an outer peripheral portion of the driving part 29 of a rotary actuator, and a rotatable weight member 25 is fastened to the outer periphery of the driving part 29. When the rotary actuator generates a driving torque, a reaction torque is applied to the driving part 29. At this time, a pair of laminated electrostrictive elements on the right side of the center axis of the driving part 29 are elongated and contracted and another pair of laminated electrostrictive elements on the left side of the center axis of the driving part are contracted and elongated so that the weight member 25 turns round the center axis of the driving part 29 in a desired direction. Thus, the reaction torque applied to the driving part can be reduced.

Figure 28:
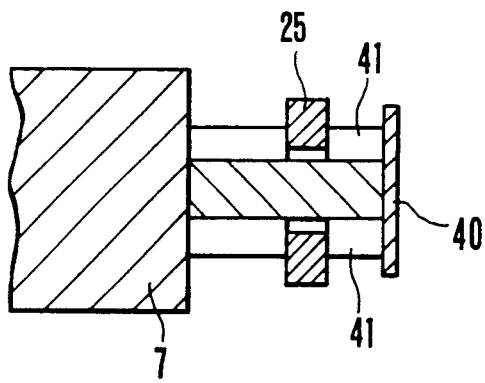
FIG. 28 is a longitudinal sectional view showing an embodiment of an inventive reaction-force reducing device using a shape memory alloy.

In the above explanation, the laminated electrostrictive element 24 has been used to move the weight member 25. However, an element for moving the weight member is not limited to the laminated electrostrictive element, but the laminated electrostrictive element may be replaced by, for example, a shape memory alloy which is operated by Joule heat. In a case where the shape memory alloy is used in place of the laminated electrostrictive element, a reaction-force reducing device has the structure shown in FIG. 28. In FIG. 28, reference numeral 40 designates the end plate of a motor guide, and 41 a wire made of a shape memory alloy. The reaction-force reducing device of FIG. 28 is similar in structure to the reaction-force reducing device of FIG. 23. In a case where a shape memory alloy wire is used in place of the laminated electrostrictive element, however, the shape memory alloy wire 41 is contracted by heating. That is, when a current flows through the wire 41, the wire 41 contacts. In contrast, the laminated electrostrictive element is elongated by applying a voltage thereto. That is, the shape memory alloy wire 41 is opposite in deformation characteristics to the laminated electrostrictive element. In the reaction-force reducing device of FIG. 28, the weight member 25 is pulled by a contracted wire 41 so that the weight member 25 makes an accelerated motion, and the reaction of the force of inertia of the weight member 25 is used for offsetting a portion or the whole of the reaction force applied to the voice-coil motor 7. A reaction-force reducing device using the shape memory alloy wire can be made smaller in weight and size than a reaction-force reducing device using the laminated electrostrictive element.

As has been explained in the foregoing, according to the present invention, it is possible to reduce the reaction caused by driving the carriage of a linear access mechanism. Thus, the vibration of the whole of a magnetic disk apparatus can be reduced, and the positioning accuracy of the linear access mechanism is improved. Further, according to the present invention, there is provided a reaction-force reducing device which is small in size and excellent in reliability.

We claim:

1. A linear access mechanism including a carriage capable of moving linearly on a guide surface, a guide mechanism for guiding the carriage, a voice-coil motor for causing the carriage to make a linear reciprocating motion, and a base for supporting the guide mechanism and the voice-coil motor, the linear access mechanism comprising:
   means for detecting the acceleration of a driving part of the linear access mechanism generated in driving the carriage, and
   anti-reaction force generating means for applying an anti-reaction force to the driving part so that the derivative of the acceleration of the driving part with respect to time is a continuous function of time.

2. A linear access mechanism according to claim 1, wherein the anti-reaction force generating means includes a laminated electrostrictive element attached to the voice-coil motor, a weight member bonded to the laminated electrostrictive element so that the laminated electrostrictive element is interposed between the voice-coil motor and the weight member, and a drive circuit for driving the laminated electrostrictive element in accordance with a reaction force which is applied to the voice-coil motor as the reaction of a driving force for driving the carriage.

3. A linear access mechanism comprising:
   a base;
   a linear guide mechanism supported on the base for defining a substantially linear guide path;
   a carriage mounted for movement along the linear guide path;
   driving means operative, when energized, to move the carriage reciprocally along the linear guide path;
   means for determining a reaction of a driving force applied to the carriage by the driving means on the basis of an energization of the driving means;
   anti-reaction force generating means operative, when energized, to generate an anti-reaction force and to apply the anti-reaction force to the carriage; and
   means for controlling an energization of the anti-reaction force generating means on the basis of the reaction of the driving force applied to the carriage and determined by the determining means such that the anti-reaction force generated by the anti-reaction force generating means is substantially equal in magnitude and opposite in direction to the reaction of the driving force applied to the carriage.

4. A linear access mechanism according to claim 3, wherein the anti-reaction force generating means includes a reaction carriage mounted for movement in a direction opposite to a moving direction of the carriage, and a voice-coil motor operative, when energized, to move the reaction carriage reciprocally along a linear path.

5. A linear access mechanism according to claim 3, wherein the determining means includes means for determining an acceleration of the carriage along the linear guide path.

6. A linear access mechanism according to claim 3, wherein the anti-reaction force generating means includes an element directly connected to the carriage such that the element and the carriage move substantially together in a same direction.

7. A magnetic disk apparatus comprising:
   a magnetic recording medium;
   means for rotatably supporting the recording medium;
   a magnetic head for reading from and writing on the recording medium;
   means for supporting the magnetic head and being movable relative to the recording medium along a predetermined linear path;
   driving means operative, when energized, to move the magnetic head supporting means along the linear path; and
   anti-reaction force generating means including:
   at least one pair of deformable elements which deform, when energized, and being connected to the magnetic head supporting means;
   a weight member movably supported between the deformable elements; and
   means for controlling an energization of the deformable elements so as to deform deformable elements disposed on one side of the weight member in one direction and to deform deformable elements disposed on the other side of the weight member in a direction opposite to the one direction, thereby controllably moving the weight member such that the weight member produces an anti-reaction force which substantially cancels a reaction of a driving force applied to the magnetic head supporting means by the driving means.

8. A magnetic disk apparatus according to claim 7, wherein the deformable elements are electrostrictive elements.

9. A magnetic disk apparatus according to claim 8, wherein each of the electrostrictive elements is a laminated electrostrictive element.

10. A magnetic disk apparatus according to claim 8, wherein the anti-reaction force generating means includes a plurality of pairs of electrostrictive elements, wherein one electrostrictive element in each pair is disposed on one side of the weight member and the other electrostrictive element in each pair is disposed on the other side of the weight member.

11. A magnetic disk apparatus according to claim 10, wherein the electrostrictive elements disposed on one side of the weight member elongate when energized and the electrostrictive elements disposed on the other side of the weight member contract when energized, the electrostrictive elements which elongate being energized earlier than the electrostrictive elements which contract.

12. A magnetic disk apparatus according to claim 7, wherein each of the deformable elements is a wire made of a shape memory alloy.

* * * * *